US012777314B2

(12) United States Patent
Kimura

(10) Patent No.: US 12,777,314 B2
(45) Date of Patent: Oct. 27, 2026

(54) INFORMATION PROCESSING APPARATUS, CONTROL METHOD, COMMUNICATION CONTROL DEVICE, AND COMMUNICATION CONTROL METHOD

(71) Applicant: CANON KABUSHIKI KAISHA, Tokyo (JP)

(72) Inventor: Yusuke Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 636 days.

(21) Appl. No.: 17/903,226

(22) Filed: Sep. 6, 2022

(65) Prior Publication Data

US 2023/0074632 A1 Mar. 9, 2023

(30) Foreign Application Priority Data

Sep. 7, 2021 (JP) ................................ 2021-145367

(51) Int. Cl.

*H04W 4/38* (2018.01)
*H04W 68/00* (2009.01)
*H04W 84/18* (2009.01)

(52) U.S. Cl.

CPC ............. *H04W 4/38* (2018.02); *H04W 68/00* (2013.01); *H04W 84/18* (2013.01)

(58) Field of Classification Search

CPC ....... H04W 4/38; H04W 68/00; H04W 84/18; H04W 4/80; H04L 12/2827; H04L 2012/2841; H04L 12/2807; H04L 67/12; Y02D 30/70

See application file for complete search history.

(56) References Cited

U.S. PATENT DOCUMENTS

| | | | | |
|---|---|---|---|---|
| 10,425,244 | B2 * | 9/2019 | Rao | G06Q 30/0276 |
| 10,848,789 | B2 * | 11/2020 | Fang | H04N 21/42221 |
| 10,939,313 | B2 * | 3/2021 | Eom | H04W 24/04 |
| 11,368,897 | B2 | 6/2022 | Koga | |
| 11,546,951 | B1 * | 1/2023 | Siminoff | H04N 7/186 |
| 11,941,922 | B2 * | 3/2024 | Meyer | H04W 4/40 |

(Continued)

FOREIGN PATENT DOCUMENTS

| | | | |
|---|---|---|---|
| CN | 107148038 | A | 9/2017 |
| JP | 2013-157754 | A | 8/2013 |
| JP | 2019193077 | A | 10/2019 |

(Continued)

OTHER PUBLICATIONS

Z-Wave 500 Series Appl. Programmers Guide v6.8x.0x (ZWAVE) (Year: 2020).*

(Continued)

*Primary Examiner* — Joseph E Avellino
(74) *Attorney, Agent, or Firm* — Venable LLP

(57) ABSTRACT

An information processing apparatus capable of communicating with a communication device comprises: an acquisition unit configured to acquire at least an item for which the communication device can provide notification to the information processing apparatus, from the communication device, during pairing with the communication device; and an instruction unit configured to provide an instruction for enabling or disabling a notification setting for the item that has been acquired by the acquisition unit to the communication device during the pairing with the communication device.

22 Claims, 12 Drawing Sheets

(56) References Cited

U.S. PATENT DOCUMENTS

| | | | | |
|---|---|---|---|---|
| 2017/0064412 | A1 | 3/2017 | Taxier | |
| 2020/0359456 | A1* | 11/2020 | Suzuki | H04W 88/06 |

FOREIGN PATENT DOCUMENTS

| | | | |
|---|---|---|---|
| JP | 2020028042 | A | 2/2020 |
| JP | 2020-195107 | A | 3/2020 |
| JP | 2020188299 | A | 11/2020 |
| WO | 2021028397 | A1 | 2/2021 |

OTHER PUBLICATIONS

Z-Way Essentials, The Z-Wave.Me Team (ZWAY) (Year: 2020).*

Dawoud, D.S., & Dawoud, P. (2020). Microcontroller and Smart Home Networks (1st ed.). River Publishers. Chapter 10: Z-Wave Technology; https://doi.org/10.1201/9781003338833; (Year: 2020).*

JP 2020028042 English Translation (Year: 2020).*

Extended European Search Report issued on Jan. 23, 2023 in counterpart European Patent Appln. No. 22190145.7.

Paetz et al., "Z-Way Manual" Jul. 1, 2011; XP055091471.

Chinese Office Action dated Mar. 24, 2026 in counterpart Chinese Patent Appln. No. 202211069432.9, with English translation.

European Office Action dated May 22, 2025 in counterpart European Patent Appln. No. 22190145.7.

Japanese Office Action dated Apr. 15, 2025 in counterpart Japanese Patent Appln. No. 2021-145367.

* cited by examiner

FIG. 6A

600

601 602 603

| NodeID | Notification object items | Notification setting |
|---|---|---|
| 0x06 | smoke | ON |
| 0x06 | co | ON |

FIG. 6B

610

601 602 603

| NodeID | Notification object items | Notification setting |
|---|---|---|
| 0x06 | smoke | ON |
| 0x06 | co | OFF |

INFORMATION PROCESSING APPARATUS, CONTROL METHOD, COMMUNICATION CONTROL DEVICE, AND COMMUNICATION CONTROL METHOD

BACKGROUND OF THE INVENTION

Field of the Invention

The present invention relates to an information processing apparatus, a control method, a communication control device, a communication control method, a storage medium, and the like.

Description of the Related Art

There is a standard referred to as the "Z-Wave", which is a communication standard of a wireless network that collects sensor data from a communication device having a sensor function. In such a wireless network, the communication device (subsidiary unit) having a sensor function transmits a notification to the main unit according to conditions that have been set in advance by the communication device (main unit) that collects sensor data.

The main unit has a system in which a cooperative operation with the main unit or another subsidiary unit can be set that uses a notification received from the subsidiary unit as a trigger. For example, when the main unit receives a notification indicating that smoke is detected from the subsidiary unit that has a sensor function for detecting smoke, the setting can be performed such that the camera is directed toward a predetermined position. Alternatively, the setting can be performed such that the subsidiary unit is instructed to turn the power supply ON, wherein turning the power supply ON/OFF can be controlled, and a lighting device being connected is turned on when the main unit receives a notification indicating that the door opens from the subsidiary unit, which has a sensor function for detecting the opening/closing of the door.

In the Z-Wave standard, notification setting can be performed to each of the items of a subsidiary unit to be notified. For example, it is possible to set notification setting information relating to ON/OFF of the notification, from the main unit to the subsidiary unit. Specifically, the notification setting information can be set by selecting the item of the subsidiary unit to be notified through the operation screen of the main unit displayed on the information terminal.

For example, Japanese Patent Application Laid-Open No. 2020-195107 discloses a communication device that sets the setting information from an old subsidiary unit to a new subsidiary unit when the main unit receives a Wakeup notification from the new subsidiary unit in the state in which the old subsidiary unit is being connected when the subsidiary units are replaced. With respect to the subsidiary unit in which the notification setting disappears when the power supply is cut off, Japanese Patent Application Laid-Open No. 2013-157754 discloses a communication device that performs a notification setting on the subsidiary unit when the main unit receives a change in the power state of the subsidiary unit.

Some battery-powered subsidiary units are sold in which the notification information setting is set to OFF when they are shipped from the factory to save battery power. In this case, the operator needs to perform the notification information setting for each of the items of the subsidiary unit to be notified through the operation screen of the main unit via an information terminal 104 after pairing of the subsidiary unit. There are some subsidiary units having a plurality of notification object items, and as the number of subsidiary units to be connected increases, the operators need to perform a time-consuming install operation.

Additionally, in battery-driven subsidiary units, even if the operator performs the notification information setting, it takes time until the setting is applied to the subsidiary unit. For example, the subsidiary unit conforming to the Z-Wave standard shifts to the Sleep state immediately after pairing has been completed. In the case in which the notification information settings corresponding to each of the items of the subsidiary unit to be notified are performed on the subsidiary unit in the Sleep state through the operation screen of the main unit via the information terminal 104, the setting is applied when the subsidiary unit returns to the Wakeup state.

In Japanese Patent Application Laid-Open No. 2020-195107, because the old subsidiary unit does not exist when a new unit is installed, the operator needs to set the notification information, resulting in a time-consuming install operation. In Japanese Patent Application Laid-Open No. 2013-157754, if the subsidiary unit is a battery-driven subsidiary unit, the setting is performed every time the subsidiary unit changes from the Sleep state to the Wakeup state, therefore, the battery is consumed, and it takes time until the notification information setting is applied to the subsidiary unit.

SUMMARY OF THE INVENTION

An object of the present invention is to provide an information processing apparatus that can reduce time-consuming notification setting operations.

An information processing apparatus capable of communicating with a communication device as one aspect of the present invention comprises: at least one processor or circuit configured to function as: an acquisition unit configured to acquire at least an item for which the communication device can provide notification to the information processing apparatus, from the communication device, during pairing with the communication device; an instruction unit configured to provide an instruction for enabling or disabling notification settings for the item that has been acquired by the acquisition unit to the communication device during the pairing with the communication device.

Further features of the present invention will become apparent from the following description of embodiments with reference to the attached drawings.

BRIEF DESCRIPTION OF THE DRAWINGS

FIG. 3A illustrates a device management screen 300 before pairing the subsidiary unit, and FIG. 3B illustrates a device management screen 310 after pairing the subsidiary unit.

FIGS. 6A and 6B are tables showing an example of information regarding a notification object item acquired in the first embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
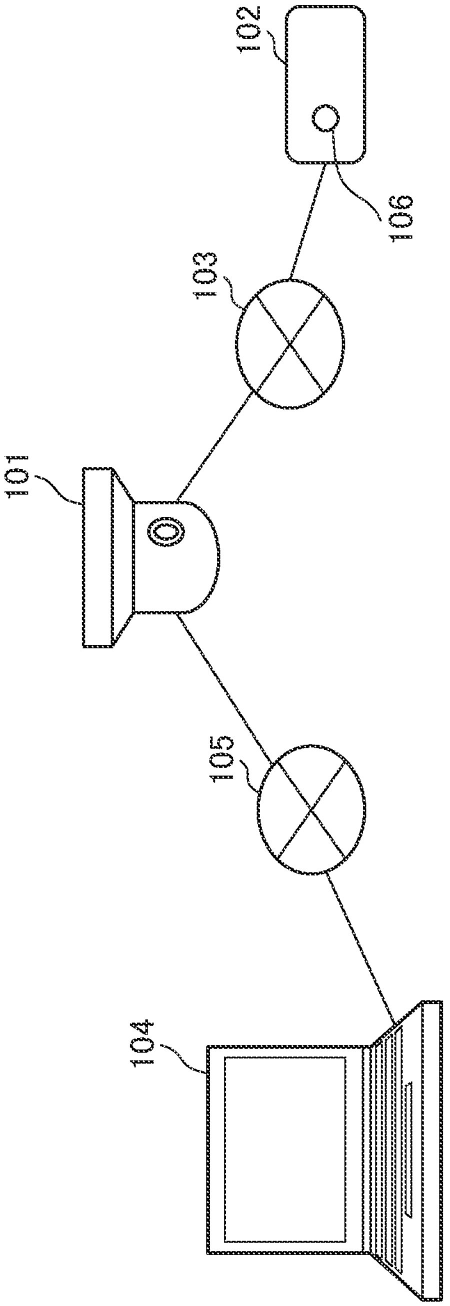
FIG. 1 is a configuration diagram of a communication system using a network camera 101 according to the first embodiment.

FIG. 1 is a configuration diagram of a communication system using a network camera 101 according to the first embodiment. The communication system shown in FIG. 1 is configured by including the network camera 101 serving as an information processing apparatus, the sensor device 102 serving as a communication device, and an information terminal 104 serving as a communication control device. The network camera 101 can communicate with the sensor device 102 via a network 103. Additionally, the network camera 101 can communicate with the information terminal 104 via a network 105. The sensor device 102 has a pairing button 106 for establishing the communication with the network camera 101. The sensor device 102 is one or a plurality of sensor devices.

The network camera 101 serving as an information processing apparatus includes a camera having an image pickup function, and can deliver the captured images and video images to the information terminal 104 via the wired or wireless network 105. Additionally, it is possible to control at least one of an image pickup operation, direction control such as the angle of view and panning or tilting of the network camera 101, and video image recording control, by using the information terminal 104 that communicates with the network camera 101 via the wired or wireless network 105. In addition to this, or in place of this, it is possible to perform the settings related to communication with the network camera 101.

The network 105 may be a wired communication network conforming to a wired communication method including a wired LAN, or may be a wireless communication network conforming to a wireless communication method including the IEEE802.11 series standard. In this case, the network camera 101 may operate as an access point that constructs the network 105 or may operate as a station participating in the network 105, which is constructed by the information terminal 104 or an access point (not illustrated).

The network 105 may be a network conforming to a wireless communication method including the Wi-Fi Direct standard or the Wi-Fi NAN standard. Alternatively, the network 105 may be a network conforming to wireless communication methods such as Bluetooth (registered trademark), NFC, UWB, MBOA, ZigBee (registered trademark), Z-Wave, and the like, instead of the IEEE802.11 series standard.

NAN is an abbreviation for “Nearfield Awareness Networking”, and NFC is an abbreviation for “Near Field Communication”. UWB is an abbreviation for “Ultra Wide Band”. MBOA is an abbreviation for “Multi Band OF DM (Orthogonal Frequency Division Multiplexing) Alliance”. UWB includes wireless USB, wireless 1394, WiNET and the like.

The sensor device 102 is a sensor capable of detecting at least one of a concentration of a gas, for example, smoke and carbon monoxide, temperature, a predetermined action of an object such as opening or closing of a door, and transmits a notification to the network camera 101 according to conditions that have been set in advance. Specifically, the sensor device 102 can provide a notification indicating that the concentration of smoke or carbon monoxide or the temperature has exceeded a certain criterion, and can provide a notification regarding a predetermined action of an object (opening and closing of a door) and the like, and can provide a notification regarding the timing for exchanging the sensor devices.

The setting can be performed such that the detection of smoke is reported to the network camera 101, for example, when the sensor device 102, which is a sensor that enables measuring smoke, measures smoke having a predetermined concentration or higher. Alternatively, the setting can be performed such that the network camera 101 is directed to a predetermined position (for example, the direction of the heat source) via the network 103 when smoke with a predetermined concentration or higher is measured.

Thus, the information processing apparatus including the network camera 101 performs a predetermined operation (predetermined control) upon receiving a predetermined notification (detection result by the sensor device 102) from the communication devices such as the sensor device 102. Here, the predetermined operation (predetermined control) includes controlling the network camera. Additionally, controlling the camera includes at least one of, for example, an image pickup operation of the camera, direction control of the camera, and video image recording control of the camera.

The sensor device 102 may be a camera, for example, an infrared camera, which is provided at a position that is different from the position where network camera 101 is installed. In this case, for example, when a suspicious person performs a predetermined action, the sensor device 102 may transmit the matter to the network camera 101. In this case, the network camera 101 may be controlled so as to be directed toward the suspicious person.

The conditions under which a notification is provided from the sensor device 102 can be set by the operator by using the information terminal 104 that communicates with the network camera 101 via the network 105. Alternatively, the setting may be performed by the operator by using an information terminal (not illustrated) capable of communicating via the network 103. Alternatively, the setting may be performed by the operator by using an information terminal (not illustrated) that directly and wirelessly communicates with the sensor device 102 rather than communicating through the network camera 101.

The network 103 is a wireless communication network based on the wireless communication method conforming to the Z-Wave standard. In this case, the sensor device 102 can execute the notification to the network camera 101 by using a profile predefined by the Z-Wave standard. The network 103 may be a wireless communication network based on the wireless communication method conforming to the Wi-Fi NAN standard or the ZigBee (registered trademark) standard instead of the Z-Wave standard.

The network 103 may be wired or wireless if it is a network in which the sensor device 102 can communicate with other devices such as the network camera 101 that can communicate via the network 103 according to the condition set in advance.

When the sensor device 102 provides a notification to the network camera 101, the network camera 101 manages, as the main unit, communication information regarding communication with the sensor device 102 serving as a subsidiary unit, and notification setting information regarding notification executed by the sensor device 102. The ON/OFF (enable/disable) of the setting for transmitting a notification when, for example, the sensor device 102 measures smoke having a predetermined concentration or higher, is managed as the communication information. Details of the notification setting information will be described below with reference to FIG. 6.

The notification setting is a setting that is reported to the network camera 101 by the sensor device 102. When the setting is "enabling (ON)", the sensor device 102 notifies the network camera 101 about the detection result by the sensor device 102, and if the setting is "disabling (OFF)", the sensor device 102 does not notify the network camera 101 about the detection result.

The network camera 101 assigns node IDs to each of the subsidiary units to be managed, and manages the notification setting information by linking to the node IDs. In the Z-Wave standard, notification setting can be performed on the respective notification object items of the subsidiary unit.

In the present embodiment, the notification setting information regarding ON/OFF of the notification can be set to, for example, the sensor device 102 communicating with the network camera 101. More specifically, the notification setting information can be set by selecting a notification object item in the subsidiary unit via the operation screen of the main unit being displayed on the information terminal 104.

In the present embodiment, although the network camera 101 communicates with the information terminal 104 via the network 105, and communicates with the sensor device 102 via the network 103, the present invention is not limited thereto, and the network camera 101 may communicate with the information terminal 104 and the sensor device 102 via the same network. Additionally, the communication executed in the network 105 and the communication executed in the network 103 may be communication conforming to different communication standards or may be communication conforming to the same communication standard.

Additionally, in the present embodiment, although the network camera 101 communicates with the sensor device 102, the present invention is not limited thereto, and the network camera 101 may communicate with a plurality of sensor devices having various functions in parallel.

Additionally, it suffices if the information terminal 104 controls the pairing of the network camera 101 and the sensor device 102, and other operations by communicating with the network camera 101.

Additionally, the information terminal 104 may control the pairing of the network camera 101 and the sensor device 102, and other operations by communicating with at least one of the network camera 101 and the sensor device 102.

Figure 2B:
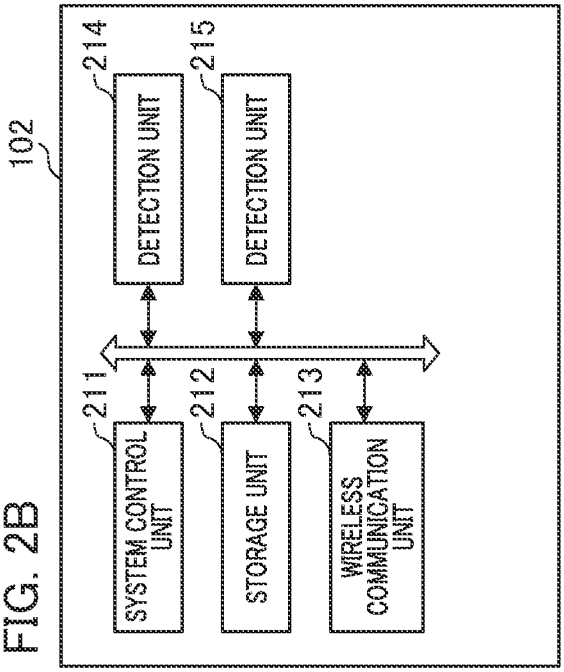
FIG. 2B is a block diagram showing a hardware configuration of a sensor device 102 according to the first embodiment.
Figure 2A:
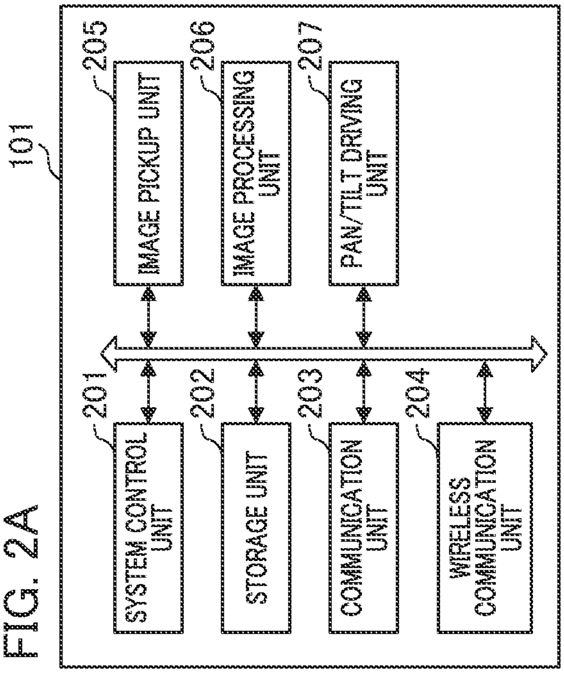
FIG. 2A is a block diagram showing a hardware configuration of the network camera 101 according to the first embodiment.
Figure 2C:
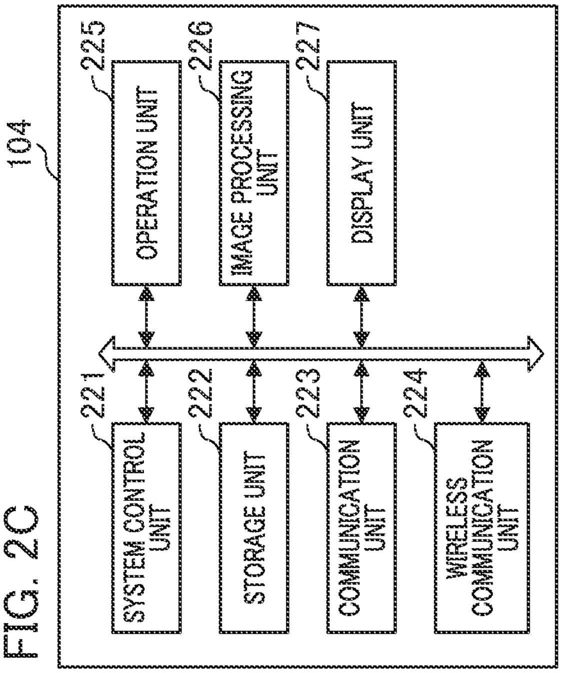
FIG. 2C is a block diagram showing a hardware configuration of an information terminal 104 according to the first embodiment.

FIG. 2A is a block diagram showing a hardware configuration of the network camera 101 according to the first embodiment, and FIG. 2B is a block diagram showing a hardware configuration of the sensor device 102 according to the first embodiment. FIG. 2C is a block diagram showing a hardware configuration of the information terminal 104 according to the first embodiment.

As shown in FIG. 2A, the network camera 101 is configured by a system control unit 201, a storage unit 202, a communication unit 203, a wireless communication unit 204, an image pickup unit 205, an image processing unit 206, a pan/tilt driving unit 207, and the like.

The system control unit 201 is configured by one or more processors such as a CPU and an MPU serving as a computer, and controls the entire network camera 101 by executing a computer program that is stored in the storage unit 202 to be described below. Note that the system control unit 201 may control the entire network camera 101 in cooperation with the computer program stored in the storage unit 202 and the OS (Operating System).

The CPU is an abbreviation for "Central Processing Unit" and MPU is an abbreviation for "Micro Processing Unit". Additionally, the system control unit 201 may be provided with a plurality of processors such as a multi-core processor to control the entire network camera 101 by the processors.

The system control unit 201 analyzes commands transmitted to the network camera 101, and performs processing according to the commands. For example, the system control unit 201 can receive a command corresponding to an instruction input by the operator via the information terminal 104 from the information terminal 104, and can execute the processing based on the received command. Additionally, the system control unit 201 detects a change in internal parameters being held by the network camera 101, and performs processing that uses the detection result as an event trigger. For example, when the information indicating the state of the sensor device 102, which is being held in the network camera 101, is changed, the process corresponding to the detection of the change can be executed.

The storage unit 202 is configured by one or more memories such as a ROM or a RAM, and stores computer programs for performing various operations and various information such as communication parameters for wireless communication. ROM is an abbreviation for "Read Only Memory", and RAM is an abbreviation for "Random Access Memory". The storage unit 202 may include at least one storage medium such as a flexible disk, a hard disk, an optical disk, a magneto-optical disk, a CD-ROM, a CD-R, a magnetic tape, a nonvolatile memory card, and a DVD, in addition to a memory including ROM, RAM, and the like.

The storage unit 202 stores parameters for image quality adjustment and set values for network settings. Even when the network camera 101 is restarted, the values set in advance can be used. Additionally, the storage unit 202 stores the communication information related to communication with the sensor device 102 serving the subsidiary unit, and the notification setting information related to the notification executed by the sensor device 102.

The communication unit 203 performs control of communication through a wired LAN or a wireless LAN. Specifically, the communication unit 203 performs the control of communication via the network 105.

The wireless communication unit 204 performs the control of communication conforming to the Z-Wave standard. Specifically, the wireless communication unit 204 performs the control of communication via the network 103.

In the present embodiment, although the network camera 101 has the communication unit 203 and the wireless communication unit 204 separately, communication through the network 105 and communication through the network 103 may be performed by one communication unit.

The image pickup unit 205 is configured by an image pickup element, for example, a lens and a CMOS sensor, and the image pickup element photoelectrically converts an optical image formed by the lens and outputs the optical image as an image pickup signal.

The image processing unit 206 performs image processing and compression encoding processing on the image pickup signal output from the image pickup unit 205 to generate image data and video data. The pan/tilt drive unit 207 is controlled by the system control unit 201 to drive the camera in the panning or tilting direction.

As shown in FIG. 2B, the sensor device 102 is configured by a system control unit 211, a storage unit 212, a wireless communication unit 213, a detection unit 214, a detection unit 215, and the like. The system control unit 211 is configured by one or more processors such as a CPU and an MPU serving as a computer and controls the entire sensor device 102 by executing a computer program that is stored in the storage unit 212 to be described below.

The storage unit 212 is configured by one or more memories such as a ROM or a RAM, and stores a computer program for performing various operations and various information such as communication parameters for wireless communication. Additionally, the storage unit 212 stores communication information related to communication with the network camera 101 serving as the main unit and notification setting information that can be set from the main unit.

The wireless communication unit 213 performs the control of communication conforming to the Z-Wave standard. Specifically, the wireless communication unit 213 performs the control of communication via the network 103.

The detection unit 214 measures, for example, a concentration of smoke by using the sensor function, and when the smoke having a predetermined concentration or higher is measured (detected), the detection unit 214 outputs a detection signal that is a detection result. The detection unit 215 measures (detects), for example, a concentration of carbon monoxide by using the sensor function, and when the carbon monoxide having a predetermined concentration or higher is measured, the detection unit 215 outputs a detection signal that is a detection result. In the present embodiment, although the sensor device 102 has two detection units 214 and 215, it is sufficient if the sensor device 102 has one or more detection units.

As shown in FIG. 2C, the information terminal 104 is configured by a system control unit 221, a storage unit 222, a communication unit 223, a wireless communication unit 224, an operation unit 225, an image processing unit 226, a display unit 227, and the like.

The system control unit 221 is configured by one or more processors such as a CPU or an MPU serving as a computer, and executes a computer program that is stored in the storage unit 222 to control the information terminal 104, the network camera 101, and the sensor device 102.

The storage unit 222 may have the same configuration as the storage unit 202. The communication unit 223 performs the control of communication via the network 105 by a wired LAN or a wireless LAN. As shown in FIG. 2C, the wireless communication unit 224 may further be provided to perform the control of communication via the network 103 by conforming to the Z-Wave standard.

In the present embodiment, although the information terminal 104 has the communication unit 223 and the wireless communication unit 224 serving as communication units separately, communication through the network 105 may be performed by one communication unit.

The operation unit 225 inputs user operations by a mouse, a keyboard, and a touch panel, and the like. The image processing unit 226 processes image data and video data to generate a display signal and the like for display. The display unit 227 includes a display device such as an LCD for displaying the image data and the video data, and is caused to display screens as shown in, for example, FIG. 3, FIG. 9, and FIG. 12.

Figure 9:
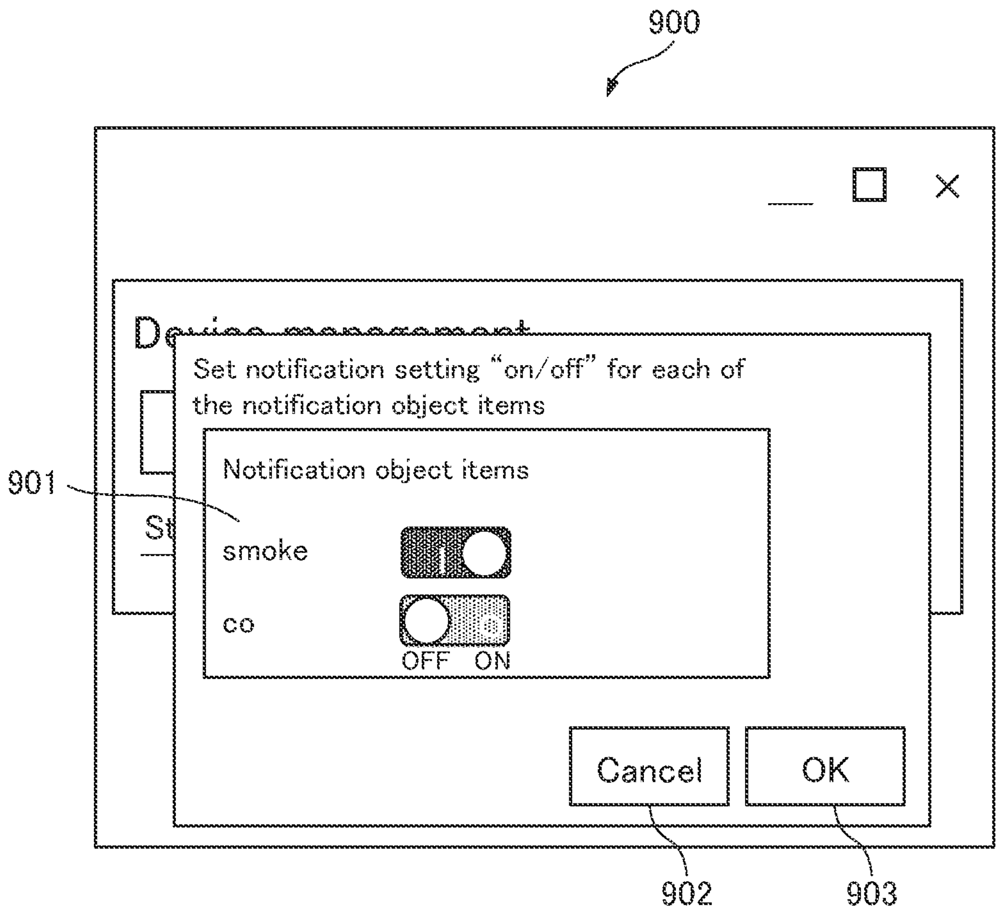
FIG. 9 illustrates an example of a screen for changing the notification setting for the notification object item, which pops up on the device management screen 300 according to the second embodiment.
Figure 12:
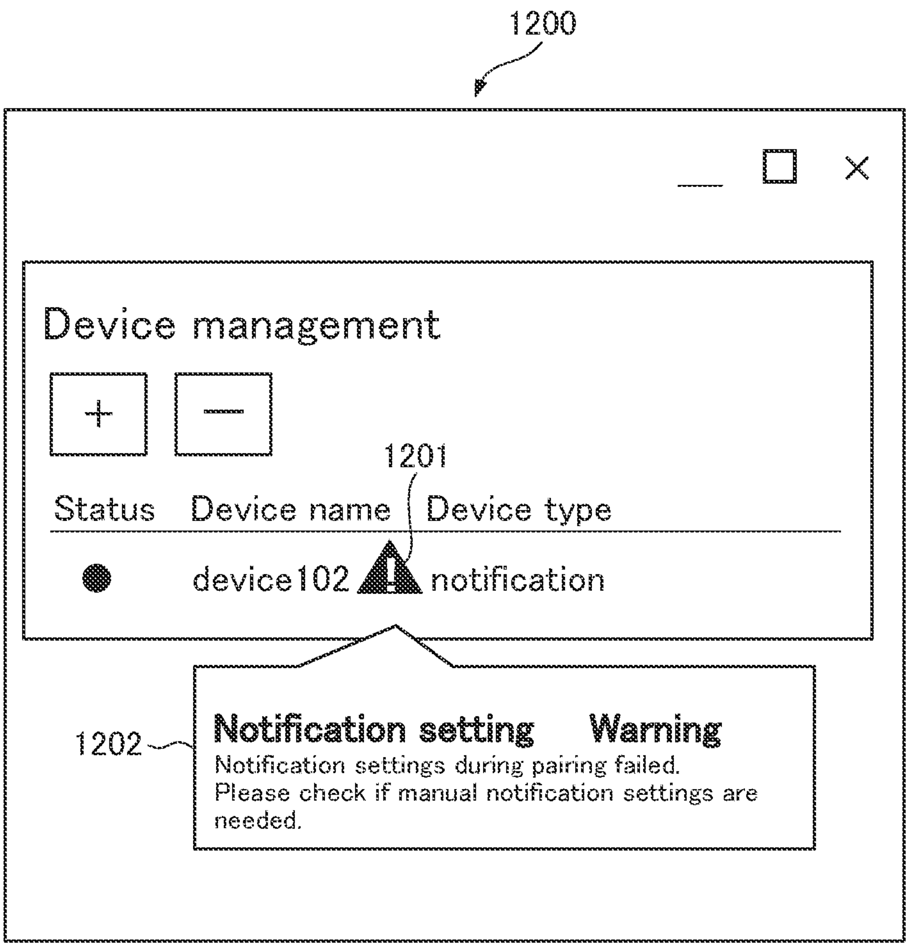
FIG. 12 illustrates an example of a screen for changing the notification setting for the notification object item, which pops up on the device management screen 300 according to the third embodiment.

The operator of the information terminal 104 can control the pairing operation of the network camera 101 and the sensor device 102 in the state in which the display unit 227 is caused to display the screens as shown in FIG. 3, FIG. 9, and FIG. 12. The operator of the information terminal 104 can also control a notification setting operation, an operation for acquiring the notification object items, various setting operations, and the like. The system control unit 221 in the information terminal 104 functions as a control unit for performing the above control.

Figure 3A:
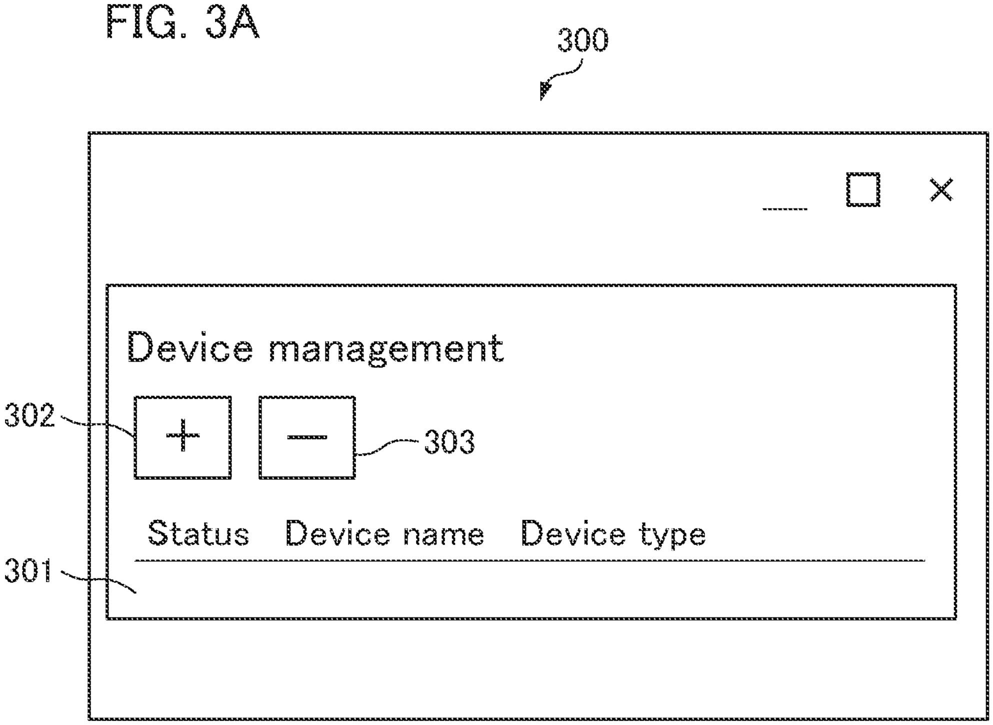
FIGS. 3A and 3B illustrate examples of device management screens for controlling the main unit by the information terminal 104, where
Figure 3B:
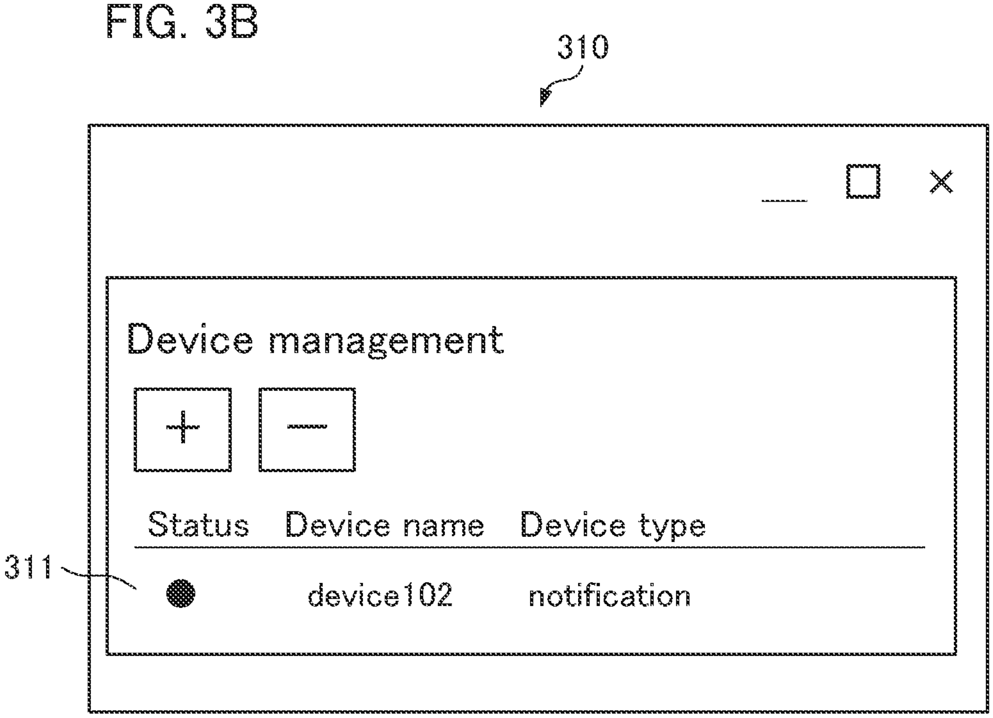

FIGS. 3A and 3B illustrate an example of a device management screen for controlling the main unit (network camera 101) by the information terminal 104, and FIG. 3A illustrates the device management screen 300 before pairing with a subsidiary unit (sensor device 102). FIG. 3B also illustrates the device management screen 310 after pairing with the subsidiary unit.

The device management screen 300 in FIG. 3A is displayed on the display unit 227 of the information terminal 104 when the information terminal 104 transmits a request for displaying the device management screen to the system control unit 201 of the network camera 101.

The device management screen 300 displays the display region 301 for displaying a list of subsidiary units, an addition button 302 for adding the subsidiary units to the display region 301, and a delete button 303 for deleting the subsidiary units from the display region 301. When the addition of the subsidiary unit is completed, the fact is transmitted to the system control unit 201, and the device management screen 310 as shown in FIG. 3B is displayed on the information terminal 104. A display region 311 displays predetermined information related to the added subsidiary unit (for example, the state of the subsidiary unit, the name of the subsidiary unit, and the type of the subsidiary unit).

Figure 4:
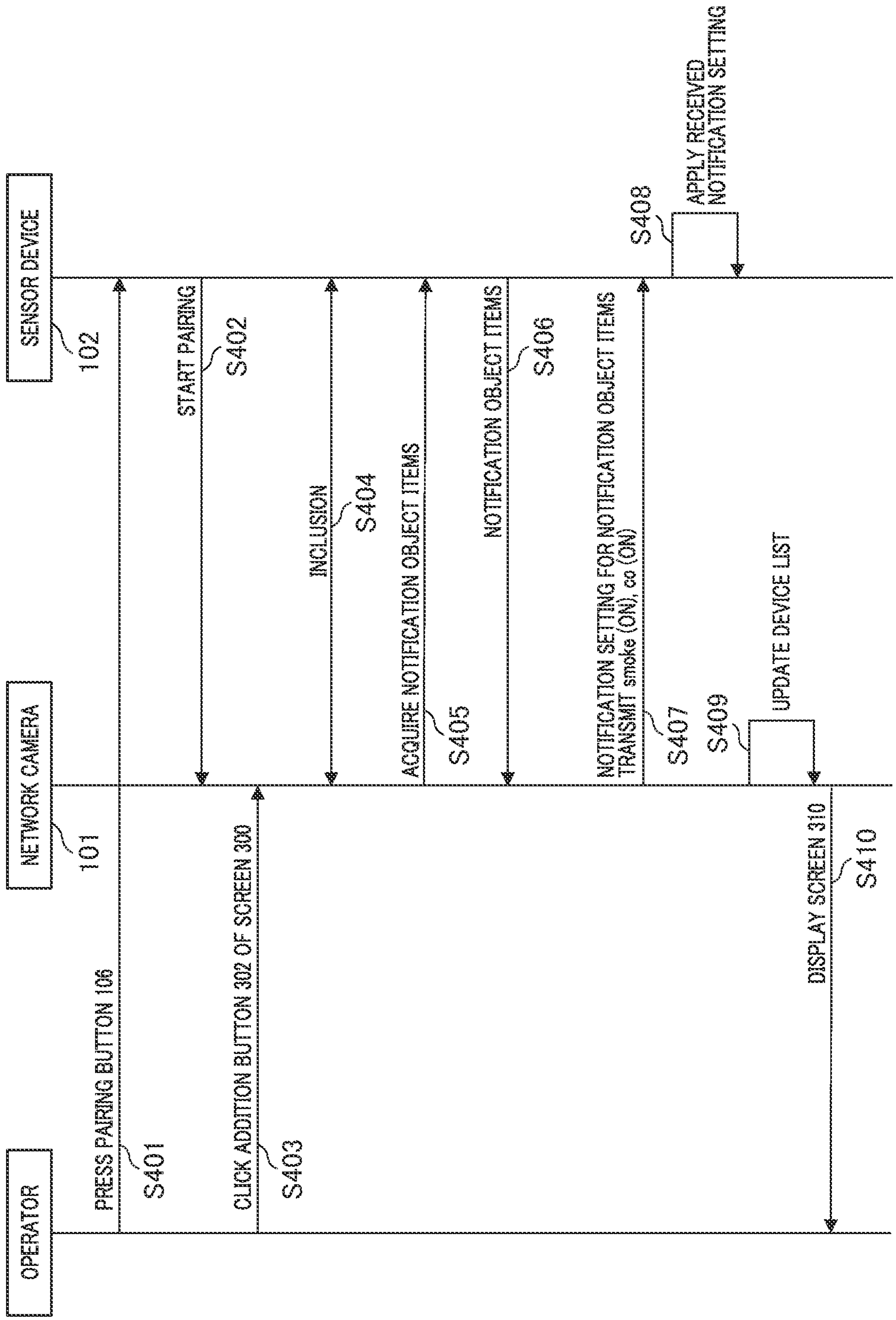
FIG. 4 is a flowchart for explaining the pairing processing in the communication system according to the first embodiment.
Figure 5:
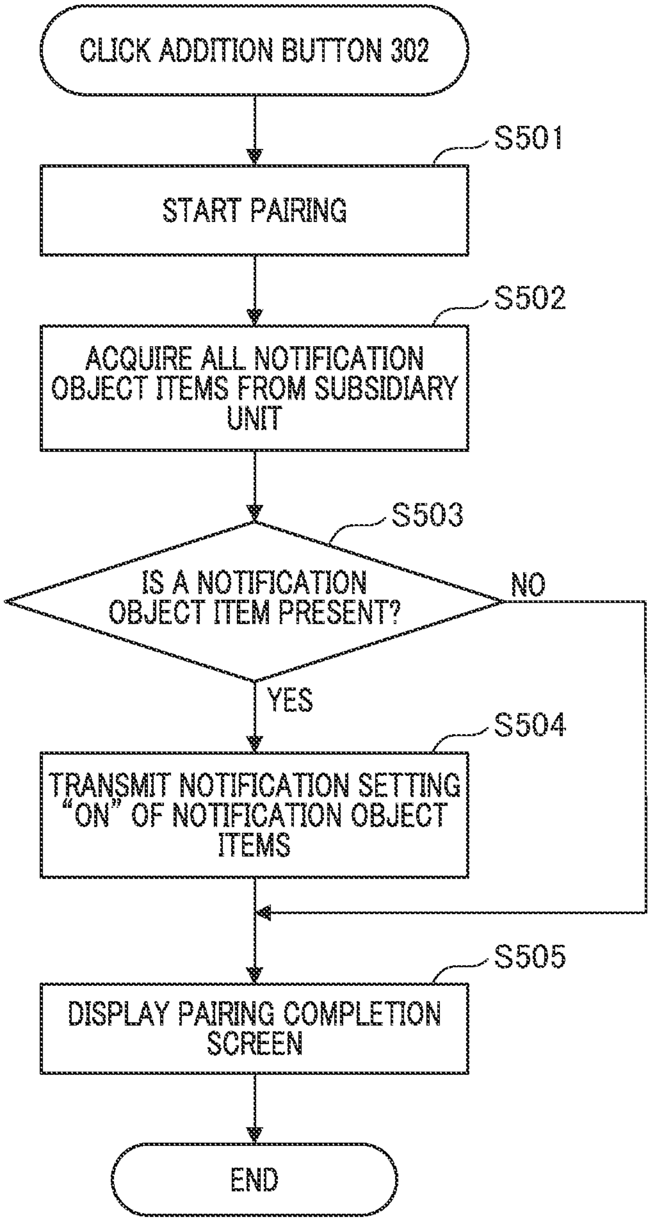
FIG. 5 is a flowchart for explaining the pairing processing in the network camera 101 according to the first embodiment.

FIG. 4 is a flowchart for explaining the pairing processing in the communication system in the first embodiment, and FIG. 5 is a flowchart for explaining the pairing processing in the network camera 101 in the first embodiment. The pairing processing in the first embodiment will be described with reference to FIG. 4 and FIG. 5.

Note that the operation of each step in FIGS. 4 and 5 is performed by the internal computer of the system control units 201, 211, 221 and the like executing a computer program being stored in the memory.

In the pairing processing according to the first embodiment, the main unit acquires all the notification object items from the subsidiary unit, and sets the notification setting information to ON with respect to each of the acquired notification object items.

In step S401, the operator presses the pairing button 106 of the sensor device 102.

In step S402, the system control unit 211 of the sensor device 102 starts the pairing processing for the sensor device 102. That is, as the pairing processing, the mode enters a learning mode for registering the subsidiary unit with the main unit. Subsequently, the system control unit 211 of the sensor device 102 waits until the network camera 101 starts the pairing processing.

In step S403, the operator clicks the addition button 302 on the device management screen 300 in FIG. 3A so that the subsidiary unit is paired and added. Then, the communication control device including the information terminal 104 transmits an instruction concerning the start of pairing to the network camera 101. Subsequently, the network camera 101 starts pairing with a communication device including the sensor device 102 in response to the reception of the instruction. Specifically, the addition button 302 triggers the start of pairing on the device management screen 300, and accordingly the system control unit 201 of the network camera 101 starts the process of the flowchart in FIG. 5.

In step S501 in FIG. 5, the system control unit 201 of the network camera 101 starts communication referred to as "Inclusion", which is the pairing processing of the network camera 101 (step S404 in FIG. 4). Specifically, a Node ID is assigned to the sensor device 102 to add a subsidiary unit. In this case, for example, it is assumed that 6 is assigned. The network camera 101 acquires the type of the subsidiary unit from the sensor device 102. Upon completion of "Inclusion" the system control unit 201 of the network camera 101 advances the process to step S502.

In step S502, the system control unit 201 of the network camera 101 requests the sensor device 102 to acquire the notification object item of the sensor device 102 via the wireless communication unit 204 (step S405 in FIG. 4). In the Z-Wave standard, there is a "Notification Supported Get" command for acquiring the notification object item of the subsidiary unit, and this command may be used.

Here, step S502 functions as an acquisition step (acquisition unit) for acquiring a predetermined notification object item from the communication device w % ben the information processing apparatus, for example, the network camera 101 is paired with the communication device, for example, the sensor device 102.

In step 406 in FIG. 4, the system control unit 211 of the sensor device 102 makes a list of the notification object items that can be detected by the detection unit 214 and the detection unit 215, and provides the list to the network camera 101.

Here, "smoke" that corresponds to smoke, which is a notification object item for the detection unit 214, and "co" that corresponds to carbon monoxide, which is the notification object item for the detection unit 215, are notified to the network camera 101.

In the Z-Wave standard, there is a "Notification Supported Report" command for providing a notification regarding the notification object item of the subsidiary unit to the main unit, and the command may be used.

For example, the system control unit 211 of the sensor device 102 reports a "Notification Supported Report" command, which conforms to the Z-Wave standard, in which "smoke" and "co" are included as Supported Type.

Step S502 and step S406 are application examples of the acquisition unit in the present invention. When the network camera 101 is paired with a communication device including the sensor device 102, all the notification object items that the communication device can report to the information processing apparatus that is a network camera 101 are acquired from the communication device. Alternatively, only a predetermined notification object item may be acquired instead of all the notification object items.

In step S503 in FIG. 5, the system control unit 201 of the network camera 101 determines the presence or absence of the notification object items. If there is one or more notification object items, the system control unit 201 advances the process to step S504. In other cases, the system control unit 201 advances the process to step S505.

In step S504, the system control unit 201 sets the notification setting to ON with respect to the received notification object items (step S407 in FIG. 4).

FIGS. 6A and 6B are tables showing an example of information regarding the notification object item to be transmitted from the system control unit 201 to the sensor device 102 according to the first embodiment.

In step 504, the system control unit 201 transmits, for example, notification setting information 600 shown in FIG. 6A to the sensor device 102 to provide an instruction regarding the contents of the notification setting information 600 to the sensor device 102. Here, the notification setting information 600 is configured by, for example, a NodeID 601 of the subsidiary unit that is the destination of notification setting, a notification object item 602, and a notification setting 603. In the Z-Wave standard, there is a "Notification Set" command for performing the notification setting on the notification object item of the subsidiary unit, and the command is used.

In the present embodiment, the system control unit 201 transmits a Notification Set, which is a Z-Wave standard command, in which EventType=smoke, Status=0xFF (meaning notification setting ON) is specified. Additionally, the system control unit 201 transmits a Notification Set, which is a Z-Wave standard command, in which EventType=co, Status=0×FF (meaning notification setting ON) is specified.

That is, in step S504, during pairing, a setting operation for enabling or disabling the notification setting is performed with respect to the notification object item acquired in the acquisition step. In addition, in the present embodiment, during pairing, notification settings are set to be enabled (ON) for all the notification object items acquired by the acquisition unit.

Thus, step S504 is an application example of the instruction unit in the present invention. During pairing with the communication device including the sensor device 102, the network camera 101 provides an instruction for enabling or disabling the notification settings for all the notification object item acquired in step S502 to the communication device. Here, the instruction for enabling or disabling the notification setting includes an instruction as to whether or not the communication device is to be caused to report the detection result performed by the communication device.

Here, step S504 functions as a notification setting step (notification setting unit) for performing the notification setting for causing the information processing apparatus including the network camera 101 to perform a predetermined operation (control) when the predetermined notification is received from the communication device including the sensor device 102.

In step S408 in FIG. 4, the system control unit 211 of the sensor device 102 stores the received notification setting information 600 in the storage unit 212 to reflect the setting information. In the present embodiment, the setting is performed such that the notification object items “smoke” and “co” are reported to the network camera 101. After the notification setting information is set, the sensor device 102 transitions to the Sleep state.

In step S505 in FIG. 5, the system control unit 201 of the network camera 101 updates the device list such that the sensor device 102 is added to the display region 301 of the device management screen 310 in FIG. 3B (step S409 in FIG. 4).

Subsequently, the system control unit 201 of the network camera 101 updates the device management screen 300 in FIG. 3A, and causes the information terminal 104 to display the device management screen 310 shown in FIG. 3B (step S410 in FIG. 4).

Subsequently, in step S505 in FIG. 5, the completion of pairing is displayed on the device management screen 310 of the information terminal 104. Here, step 505 functions as a display step (display unit) for displaying a setting screen for setting the notification setting that corresponds to the notification object item acquired by the acquisition unit.

The processes of steps S405 to S410 are executed during pairing between the network camera 101 and the sensor device 102. Here, “during pairing” means “during pairing operation” or “immediately after pairing has been completed”.

In the present embodiment, although the operation shown in the flowchart in FIG. 5 is performed by the system control unit 201 of the network camera 101, a part or all of the operation may be executed by the system control unit 221 of the information terminal 104. Specifically, the information terminal 104 communicates with each of the network camera 101 and the sensor device 102 and controls both so that the system control unit 221 of the information terminal 104 may execute the pairing operation, the notification setting step, the acquisition step, and the like.

As described above, according to the present embodiment, the communication control device for controlling the pairing operation, the notification setting step, the acquisition step, and the like, is configured by the system control unit 201 of the network camera 101 or the system control unit 221 in the information terminal 104, or both.

Second Embodiment

In the first embodiment, an embodiment in which, during pairing, the notification object items are acquired and all the notification settings are set to ON as the default has been described.

In the second embodiment, the notification object item and the notification setting screen are displayed during pairing, and the description will be given with reference to FIG. 7 to FIG. 9.

Figure 7:
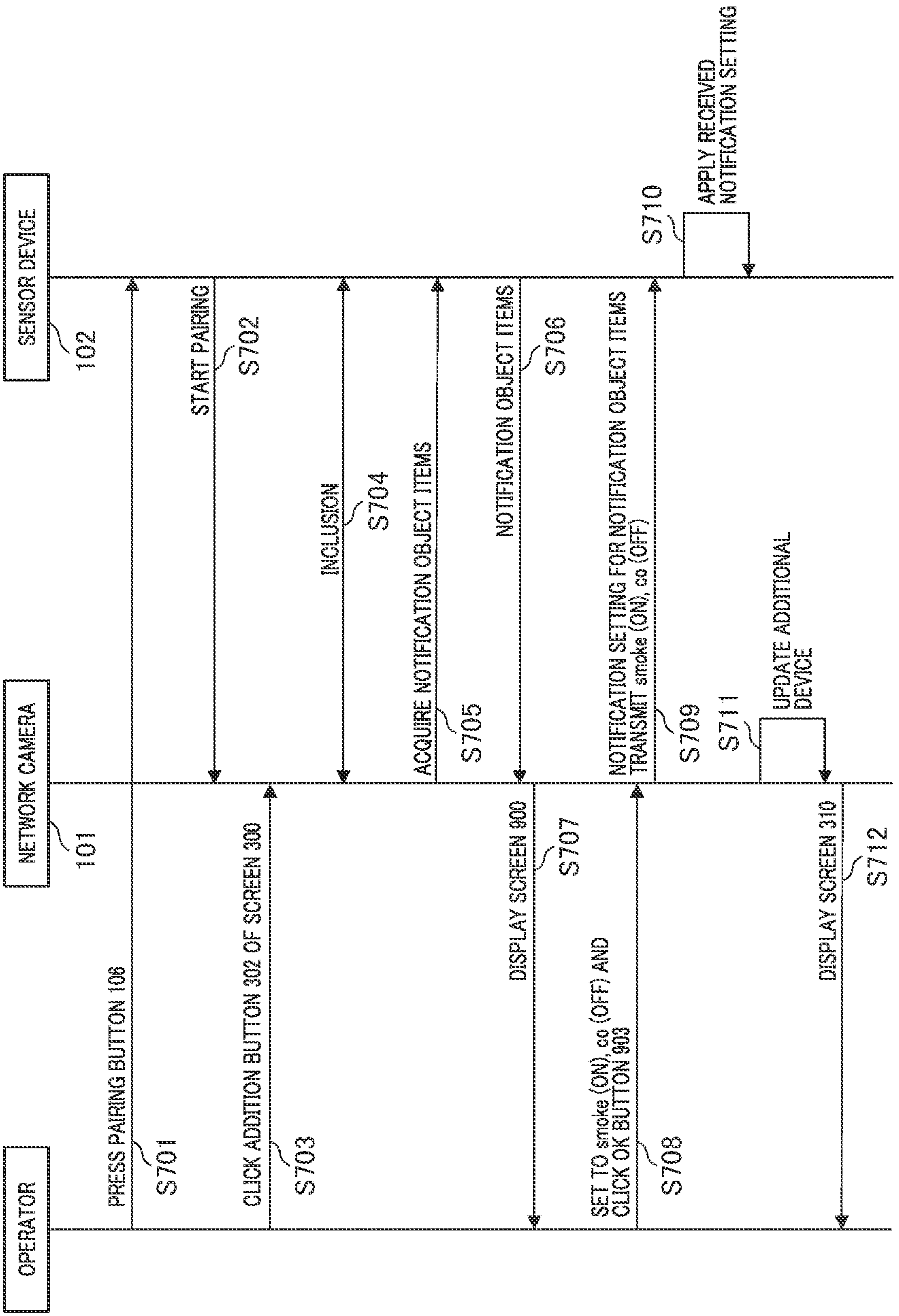
FIG. 7 is a flowchart for explaining the pairing processing in the communication system according to the second embodiment.
Figure 8:
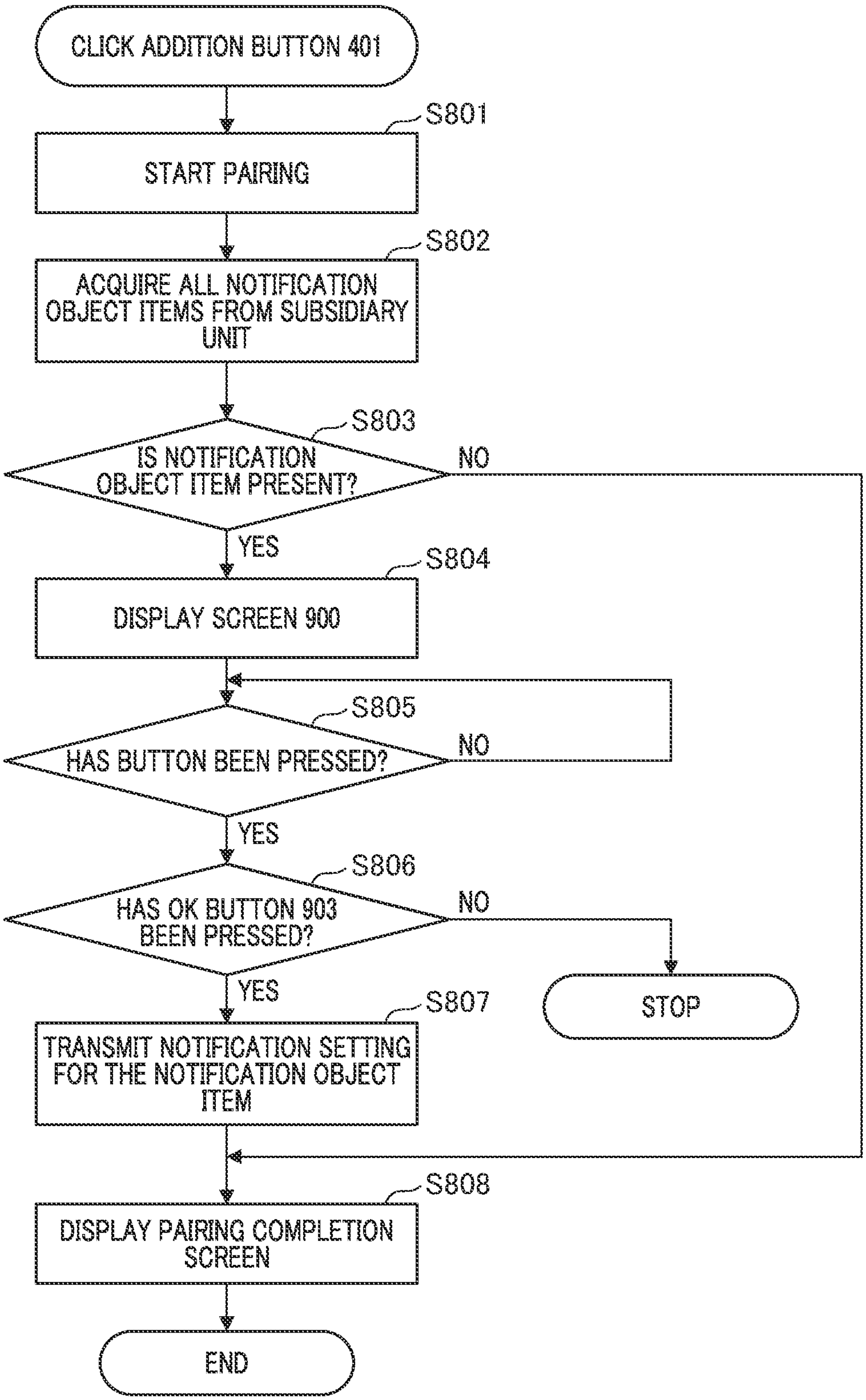
FIG. 8 is a flowchart for explaining the pairing processing in the network camera 101 according the second embodiment.

FIG. 7 is a flowchart for explaining the pairing processing in the communication system according to the second embodiment, and FIG. 8 is a flowchart for explaining the pairing processing in the network camera 101 according to the second embodiment. The operation of each step in FIG. 7 and FIG. 8 is performed by the internal computer of the system control units 201, 211, 221 and the like executing a computer program that is stored in the memory.

For example, it is assumed that the setting that starts the recording by the network camera 101 when carbon monoxide is detected by the detection unit 215 is performed. In this case, if erroneous detection of carbon monoxide occurs frequently as the result of the unstable operation caused by the failure of the detection unit 215 of the sensor device 102, the erroneous detection triggers unintended recording, and as a result, the scene that is desired to be recorded is no longer recorded. Accordingly, there are cases in which the notification from the detection unit in which erroneous detection occurs is desired to be set to OFF in advance, during pairing.

Therefore, according to the present embodiment, a setting screen on which the notification setting for the notification object item can be changed is displayed after obtaining the notification object items during pairing in the first embodiment.

Since steps S701 to S702 in FIG. 7 are the same as steps S401 to 402 in FIG. 4, the description thereof will be omitted.

In step S703, the operator presses the addition button 302 on the device management screen 300 in FIG. 3A to pair and add the subsidiary unit. Specifically, the addition button 302 triggers the start of pairing on the device management screen 300, and accordingly the system control unit 201 of the network camera 101 starts the process of the flowchart in FIG. 8.

Since steps S801 to S803 in FIG. 8 are the same as steps S501 to S503 in FIG. 5, the description thereof will be omitted. Additionally, since steps S704 to S706 in FIG. 7 are the same as steps S404 to S406 in FIG. 4, the description thereof will be omitted.

In step S804 in FIG. 8, the system control unit 201 provides a notification regarding each of the notification object items acquired in step S802 to the information terminal 104 (notification unit).

In step S707, the system control unit 221 of the information terminal 104 acquires, from the network camera 101, all the notification object items for which notification can be provided by the sensor device 102 to the network camera 101 (acquisition unit). The above the notification object items are notification object items that have been acquired by the network camera 101 from the sensor device 102 in step S705 during pairing between the network camera 101 and the sensor device 102.

Subsequently, the display unit 227 of the information terminal 104 is caused to display a notification setting screen 900 in FIG. 9 including each of the notification object items (step S707 in FIG. 7).

FIG. 9 illustrates an example of a screen for changing the notification settings of the notification object items, which is popped up on the device management screen 300 according to the second embodiment. In FIG. 9, when there is one or more notification object item acquired in step S802, in step S804, the system control unit 201 displays the notification object items.

The notification setting screen 900 displays a notification setting region 901 for displaying a name of the notification object items and a notification setting ON/OFF button for each of the notification object items, and a cancel button 902 for canceling the change of the notification setting in the notification setting region 901. Additionally, the notification setting screen 900 displays, for example, an OK button 903 for determining the change of the notification setting. For example, all the notification object items may be set to ON as the default value of the notification setting.

In step S805 in FIG. 8, the system control unit 201 waits until the pressing of the notification setting screen 900 is detected.

In the present embodiment, the operator can set "smoke" indicating the detection unit 214 to ON state and set "co" indicating the detection unit 215 to OFF state, and the like, as shown in FIG. 9 by using the notification setting ON/OFF button.

Thus, the information terminal 104 displays the setting screen for setting the notification setting corresponding to the notification object item to be enabled or disabled for each of the notification object items (display unit).

In step S805 in FIG. 8, when the pressing of a button, for example, the notification setting ON/OFF button, is detected, the system control unit 201 advances the process to step S806.

In step S806 in FIG. 8, the system control unit 201 determines whether or not the OK button 905 in FIG. 9 is pressed.

When the OK button 905 is pressed (step S708 in FIG. 7), the process proceeds to step S807. When the OK button 905 is not pressed even after the lapse of a predetermined time, the pairing processing itself stops. For example, when the cancel button 904 is pressed, the notification settings for all the notification object items may return to the ON state as the default, as in first embodiment, and the process may proceed to step S807.

In step S805 in FIG. 8, for example, in the information terminal 104, buttons such as the notification setting ON (enabling)/OFF (disabling) button for one or a plurality of notification object items are pressed by a user (operator) for each of the notification object items. Subsequently, when the pressing of the OK button 905 is detected, in step S708, the contents of instruction (contents of instruction pressed by the user) for enabling or disabling the notification setting regarding the notification object item are transmitted to the network camera 101 (transmission unit).

Subsequently, the network camera 101 receives the contents of the instruction from the information terminal 104 (reception unit). Subsequently, the system control unit 201 of the network camera 101 advances the process to step S807.

In step S807 in FIG. 8, the system control unit 201 transmits the notification setting (notification setting information 610 in FIG. 6B) after the change that was set (instructed) on the notification setting screen 900 to the sensor device 102 (step S709 in FIG. 7).

Specifically, in the present embodiment, the system control unit 201 transmits "Notification Set", which is a Z-WAVE standard command, in which EventType=smoke, Status=0×FF (meaning of the notification setting ON) is specified, to the sensor device 102. Additionally, the system control unit 201 transmits "Notification Set", which is a Z-WAVE standard command, in which EventType=co, Status=0×00 (meaning that the notification setting is OFF) is specified, to the sensor device 102.

Step S807 is an example of the application of the instruction unit according to the present invention, and an instruction for enabling or disabling the notification setting for the notification object item acquired in step S706 based on the contents of the instruction received in step S708 is provided to the sensor device 102.

In step S710 in FIG. 7, the system control unit 211 of the sensor device 102 stores the received notification setting information 610 in FIG. 6B in the storage unit 212, and applies the setting information. That is, in the present embodiment, the setting is performed such that only the notification object item "smoke" is reported to the network camera 101. After the notification setting information is set, the sensor device 102 transitions to the Sleep state.

Because steps S711 and S712 in FIG. 7 are the same as steps S409 and S410 in FIG. 4, the description thereof will be omitted.

The processes of steps S705 to S712 are executed during pairing between the network camera 101 and the sensor device 102. In this context, "during pairing" means "during pairing operation" or "immediately after pairing has been completed".

As described above, in the second embodiment, during pairing, the operator can easily change and set the notification settings excluding, for example, the notification object items for which erroneous detection is likely to occur due to the unstable operation.

Third Embodiment

In the first embodiment, an embodiment of acquiring the notification object item and setting all the notification settings to ON as the default during pairing has been described. In the third embodiment, an example of process in the case in which the notification setting for the notification object item cannot be performed during pairing is handled. Hereinafter, the third embodiment will be described with reference to FIG. 10 to FIG. 13.

Figure 10:
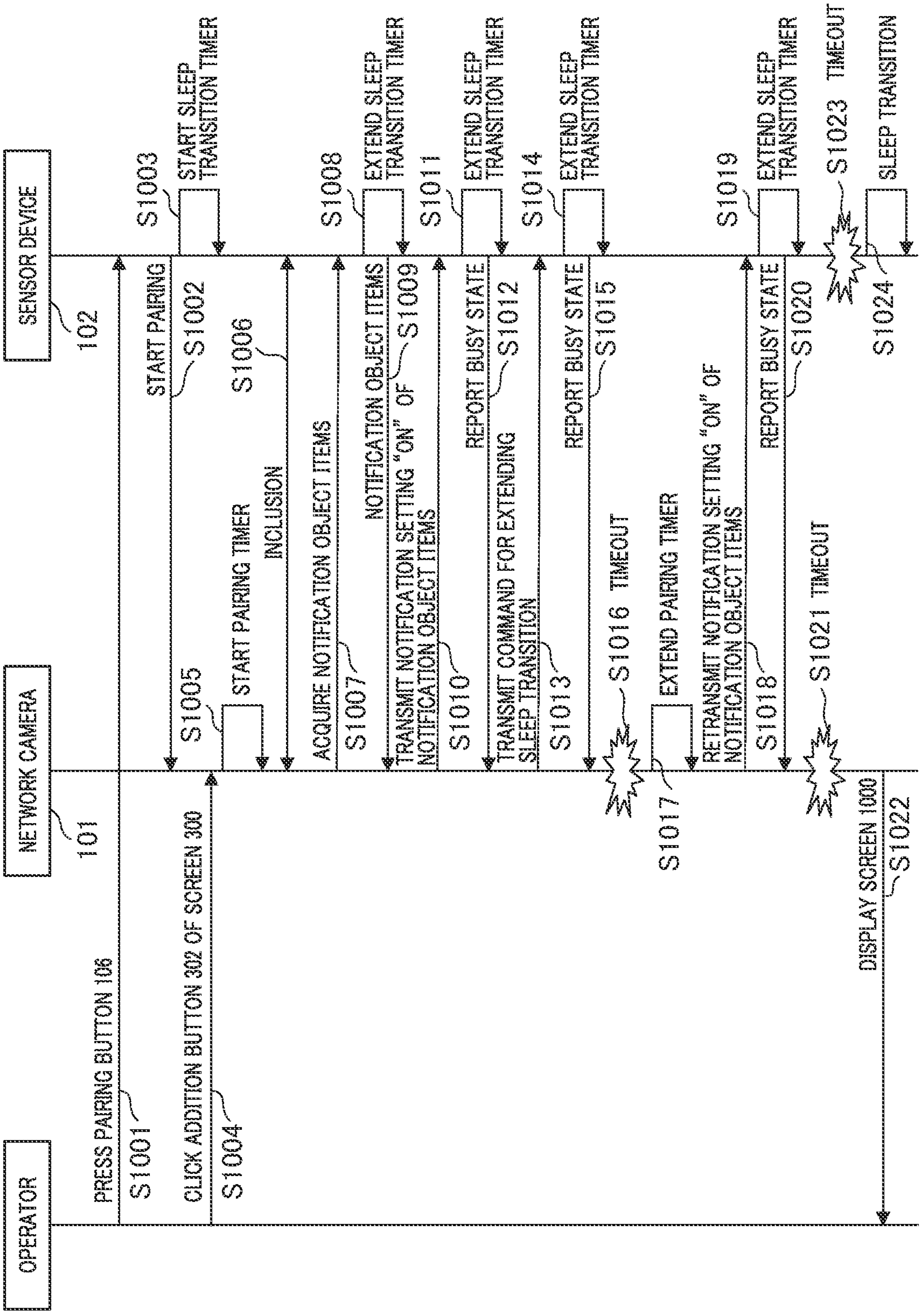
FIG. 10 is a flowchart for explaining the pairing processing in the communication system according to the third embodiment.
Figure 11A:
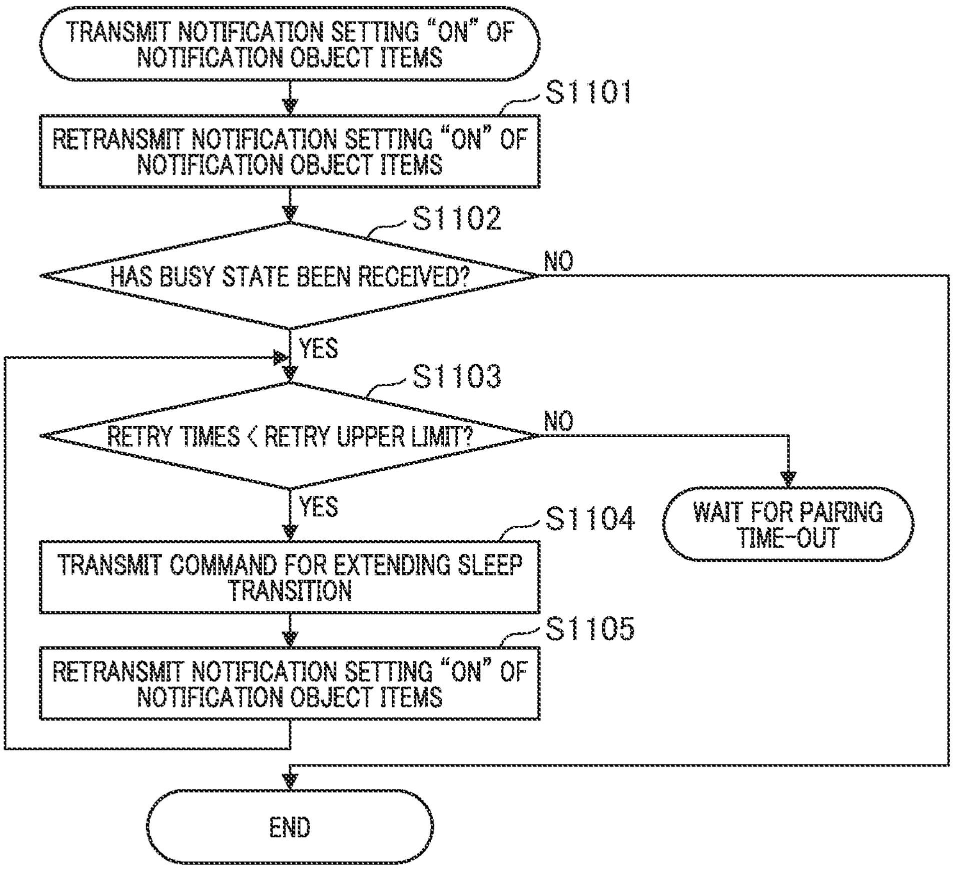
FIGS. 11A and 11B are flowcharts for explaining the pairing processing in the network camera 101 according to the third embodiment.
Figure 11B:
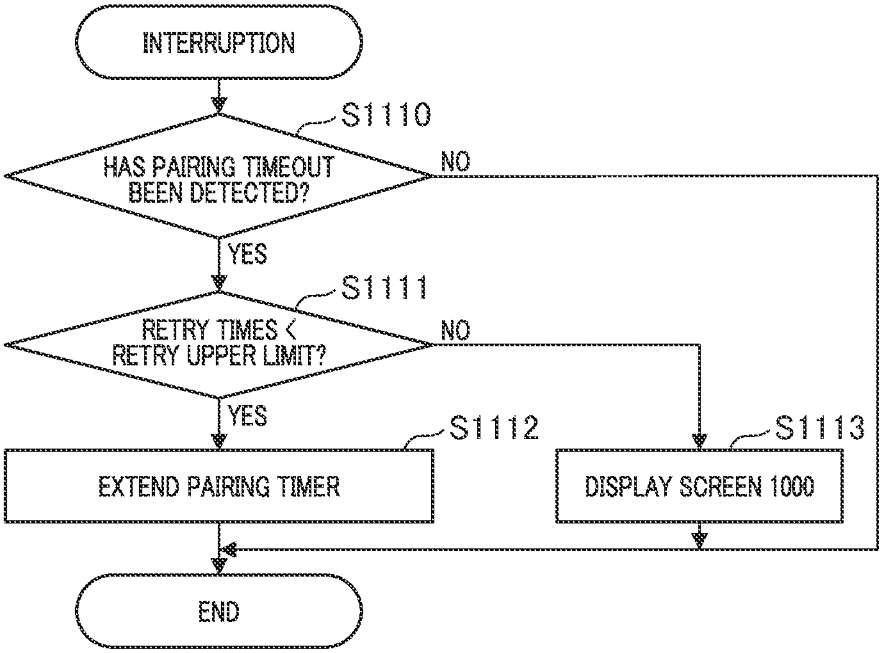

FIG. 10 is a flowchart for explaining the pairing processing in the communication system according to the third embodiment, and FIGS. 11A and 11B are flowcharts for explaining the pairing processing in the network camera 101 according to the third embodiment. The operation of each of steps in FIGS. 10 and 11 is performed by the internal computer of the system control units 201, 211, 221 and the like executing a computer program that is stored in the memory.

In the third embodiment, for example, there are cases in which, during pairing operation, the subsidiary unit enters a busy state (a state in which the setting cannot be applied temporarily) due to other processing, resulting in failure to complete the processing within a predetermined pairing processing time. If the addition of the subsidiary unit is completed without any warning while the notification setting is not made during pairing, the operator starts to use the system without noticing that the notification setting has not been made. As a result, in some cases, the notification is not sent from the subsidiary unit to the main unit even though the operator has set the notification, and the expected system operation cannot be attained.

Therefore, in the present embodiment, when the notification setting for the notification object item cannot be completed normally in the first embodiment, a retry is performed. During the retry, the time (timeout) for pairing is extended. Additionally, the sleep operation of the sensor device 102 serving as a communication device is postponed. Furthermore, a warning notice is provided. Since steps S1001 to S1002 in FIG. 10 are the same as steps S401 to 402 in FIG. 4, the description thereof will be omitted.

In step S1003 in FIG. 10, the system control unit 211 starts the Sleep transition timer. For example, in the Z-Wave standard, the Sleep transition timer is extended upon receiving the Z-Wave standard command (because steps S1008, S1011, S1014, and S1019 are the same, the description thereof will be omitted).

In step S1004 in FIG. 10, the operator clicks the addition button 302 on the device management screen 300 in FIG. 3A to pair and add the sensor device 102 serving as the subsidiary unit. Specifically, the addition button 302 is a trigger for starting pairing on the device management screen 300, and the system control unit 201 of the network camera 101 starts pairing in step S501 of the flowchart in FIG. 5.

Subsequently, in step S502, all the notification object items are acquired from the sensor device 102 serving as the subsidiary unit, and in step S503, whether or not there is an notification object item is determined.

In contrast, in step S1005 in FIG. 10, the system control unit 201 starts the pairing timer. This is for stopping the process due to a failure in pairing if the pairing cannot be completed within a predetermined time.

Because steps S1006, S1007, and S1009 in FIG. 10 are the same as S404, S405, and S406 in FIG. 4, the description thereof will be omitted.

Upon receiving the notification object item is from the sensor device 102 in step S1009 in FIG. 10, the system control unit 201 determines in step S503 in FIG. 5 that a notification object item is present, and in step S504, the system control unit 201 starts the process of the flowchart in FIG. 11A.

That is, in step S1101 in FIG. 11, the system control unit 201 sets the notification setting for the received notification object item to ON (step S1010 in FIG. 10).

Specifically, for example, the notification setting information 600 in FIG. 6A is transmitted to the sensor device 102. In response to this, the sensor device 102 notifies the main unit of, for example, a busy state (step S1012 in FIG. 10).

As one example of commands for reporting the processing status in the Z-Wave standard, there is "Application Busy". The sensor device 102 according to the present embodiment transmits Application Busy in the state in which Status=0x01 (meaning that it is desired to wait a few seconds and retry) is specified.

In contrast, the system control unit 201 determines in step S1102 in FIG. 11 whether or not the busy state has been received, and if the busy state has been received, the process proceeds to step S1103. If the busy state has not been received, the system control unit 201 determines that the notification setting has been completed normally, and the process proceeds to step S505 and subsequent steps in FIG. 5 according to the first embodiment.

In step S1103 in FIG. 11, the system control unit 201 determines whether or not the number of retries has reached the upper limit. If the number of retries is less than the upper limit, the system control unit 201 advances the process to step S1104. If the number of times is equal to or higher than the upper limit, the system control unit 201 stops the retry and waits for the pairing timer to time out. Here, the upper limit is, for example, once.

In step S1104 in FIG. 11, the system control unit 201 transmits a command for extending the Sleep transition timer (step S1013 in FIG. 10). For example, in the Z-Wave standard, any command conforming to the Z-Wave standard may be transmitted. Additionally, if the retry interval is shorter than the time-out time of the Sleep transition timer, this process may be skipped and the process may proceed to step S1105. The sensor device 102 notifies the main unit of, for example, the busy state (step S1015 in FIG. 10).

Step S1013 is an example of the application of the instruction unit according to the present invention. That is, when a predetermined notification (busy state) is received from the sensor device 102 in response to the instruction in step S1010, an instruction for postponing (extending) the sleep operation of the sensor device 102 is provided to the sensor device 102.

In step S1016 in FIG. 10, the system control unit 201 generates an interruption upon detecting the timeout of the pairing timer. The system control unit 201 starts the operation of the flowchart in FIG. 11B upon detecting the interruption.

In step S1110 in FIG. 11B, the system control unit 201 determines whether or not the interruption type is the detection of timeout of the pairing timer. If the interruption type is the time out detection of pairing time, the system control unit 201 advances the process to step S1111. If the interruption type is other than the time out detection of pairing time, interruption processing ends.

In step S1111, the system control unit 201 determines whether or not the retry is being performed based on whether or not the number of retries has reached the upper limit. If the number of retries is less than the upper limit, the system control unit 201 advance the process to step S1112. If the number of retries is equal to or higher than the upper limit, the system control unit 201 advances the process to step S1113. At the time point in step S1016 in FIG. 10, since the number of retries is the 0th time that is less than the upper limit, the process proceeds to step S1112 in FIG. 11.

In step S1112, the system control unit 201 extends the pairing timer (time limit for pairing) (step S1017 in FIG. 10). The system control unit 201 advance the process to S1105 in FIG. 11A to continue the retry processing.

In step S1105, the system control unit 201 performs retransmission of the notification setting ON of the notification object item (step S1018 in FIG. 10). In response to this, the sensor device 102 notifies the network camera 101 serving as the main unit of the busy state (step S1020 in FIG. 10). Subsequently, the system control unit 201 advances the process to step S1103.

Step S1018 is an example of the application of the instruction unit in the present invention. That is, when a predetermined notification (busy state) is received from the sensor device 102 in response to the instruction in step S1010, an instruction for enabling or disabling the notification setting related to the notification object item is again provided to the sensor device 102. Additionally, in step S1017, the instruction unit extends the time limit for pairing.

In step S1103, the system control unit 201 determines whether or not the number of retries has reached the upper limit. Since the number of retries is once at the time point in step S1020, the system control unit 201 stops retrying and waits for the timeout of the pairing timer.

In step S1021 in FIG. 10, the system control unit 201 generates an interruption upon detecting the timeout of the pairing timer. When the system control unit 201 detects the interruption, it starts the flowchart in FIG. 11B.

In step S1110, the system control unit 201 determines whether or not the interruption type is a timeout detection of pairing timer. Since the interruption type is the timeout detection of pairing timer, the system control unit 201 advances the process to step S1111.

In step S1111, the system control unit 201 determines whether or not the retry is being performed based on whether or not the number of retries has reached the upper limit. At the time point in step S1021, because the number of retries has reached the upper limit, the system control unit 201 advance the process to step S1113.

In step S1113, the system control unit 201 displays a warning screen 1200 in FIG. 12 showing that the notification setting failed during pairing (step S1022 in FIG. 10). Specifically, a warning mark 1201 is displayed in the display region 311 of the device management screen 310 in FIG. 3B on the warning screen 1200. When the operator places the mouse cursor over the warning mark 1201, a warning message 1202 as shown in FIG. 12 is displayed.

Step S1022 is an example of the application of the instruction unit according to the present invention, and in step S1018, an instruction for enabling or disabling the notification setting for the notification object item is provided again to the sensor device 102. Subsequently, in step S1020, a warning is reported to the information terminal 104 under the condition that a predetermined notification (busy state) is received from the sensor device 102 in response to the instruction.

When the Sleep transition timer times out (step S1023 in FIG. 10), the sensor device 102 transitions to the Sleep state (step S1024 in FIG. 10).

The processes of steps S1007 to S1022 are executed during pairing between the network camera 101 and the sensor device 102. Here, "during pairing" means "during pairing operation" or "immediately after the pairing has been completed".

As described above, according to the third embodiment, the operator can easily recognize that the notification setting has failed, and it is possible to prevent the sensor device 102 from being used while the notification setting has failed.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

For example, in the embodiments, an example of the network camera serving as a camera has been described. However, the camera includes electronic equipment having an image pickup function, such as a digital still camera, a digital movie camera, a smartphone with a camera, a tablet computer with a camera, an on-vehicle camera, a drone camera, a camera mounted on a robot.

Furthermore, for example, in the first to third embodiments described above, the setting for enabling or disabling the notification setting is the setting of whether or not a predetermined notification by a communication device such as the sensor device 102 is to be performed. However, the setting for enabling or disabling the notification setting may be a setting for whether or not the information processing apparatus is caused to perform a predetermined operation when the information processing apparatus such as the network camera 101 receives the predetermined notification. The present invention also includes such a modification.

In addition, as a part or the whole of the control according to the embodiments, a computer program realizing the function of the embodiments described above may be supplied to the information processing apparatus through a network or various storage media. Then, a computer (or a CPU, an MPU, or the like) of the information processing apparatus may be configured to read and execute the program. In such a case, the program and the storage medium storing the program configure the present invention.

This application claims the benefit of Japanese Patent Application No. 2021-145367 filed on Sep. 7, 2021, which is hereby incorporated by reference herein in its entirety.

What is claimed is:

1. An information processing apparatus capable of communicating with a communication device having at least one detection unit for detecting an environmental condition, comprising:

at least one processor or circuit configured to function as:

an acquisition unit configured to acquire at least one item as a type of notification information of a notification object for which the communication device can provide notification relating to detection results from the at least one detection unit to the information processing apparatus in a case where a notification setting relating to the detection results from the at least one detection unit is set to be enabled, from the communication device, during a pairing operation with the communication device; and an instruction unit configured to provide an instruction for enabling or disabling, during the pairing operation with the communication device, notification settings relating to the detection results from the at least one detection unit for each item as the type of notification information of the notification object that has been acquired by the acquisition unit to the communication device during the pairing operation with the communication device.

2. The information processing apparatus according to claim 1, wherein the acquisition unit acquires the at least one item and the instruction unit provides the instruction using Z-Wave standard commands.

3. The information processing apparatus according to claim 1, wherein the acquisition unit acquires the at least one item as the type of notification information of the notification object from the communication device in response to reception of an instruction concerning the start of the pairing from a communication control device, wherein the instruction concerning the start of the pairing includes an instruction for assigning a Node ID to the communication device.

4. The information processing apparatus according to claim 1, wherein the acquisition unit acquires all of the items as the type of notification information of the notification object from the communication device, during pairing with the communication device, and wherein the instruction unit performs the instruction for enabling the notification setting related to all of the items that have been acquired by the acquisition unit to the communication device during the pairing with the communication device.

5. The information processing apparatus according to claim 3 wherein the at least one processor or circuit is further configured to function as:

a reception unit configured to receive an instruction for enabling or disabling the notification setting for the at least one item as the type of notification information of the notification object from the communication control device, wherein the instruction unit provides an instruction for enabling or disabling the notification setting for each item as the type of notification information of the notification object to the communication device based on the contents of the instruction that the reception unit has received.

6. The information processing apparatus according to claim 1, wherein if the instruction unit receives a predetermined notification from the communication device in response to the instruction by the instruction unit, the instruction unit provides an instruction for enabling or disabling the notification setting for the at least one item to the communication device again and extends a time limit for the pairing.

7. The information processing apparatus according to claim 6, wherein the instruction unit provides an instruction for enabling or disabling the notification setting for the at least one item to the communication device again, and provides a warning notification to the communication control device on the condition that the predetermined notification has been received from the communication device in response to the instruction.

8. The information processing apparatus according to claim 1, wherein if the instruction unit has received a predetermined notification from the communication device in response to an instruction by the instruction unit, the instruction unit provides an instruction for postponing a sleep operation of the communication device to the communication device.

9. The information processing apparatus according to claim 1, wherein the sensor device detects at least one of gas, a temperature, or a predetermined action of an object.

10. The information processing apparatus according to claim 1, wherein the information processing apparatus includes a camera.

11. The information processing apparatus according to claim 10, further comprising at least one processor or circuit configured to function as:

a control unit configured to perform predetermined control of the camera upon receipt of a predetermined detection result by the communication device with respect to the at least one item for which the notification setting has been set to be enabled, from the communication device.

12. The information processing apparatus according to claim 11, wherein the predetermined control includes at least one of an image pickup operation of the camera, direction control of the camera, or video image recording control of the camera.

13. The information processing apparatus according to claim 1, wherein an instruction for enabling or disabling the notification setting includes an instruction as to whether or not to cause the communication device to report the predetermined detection result by the communication device.

14. A control method in an information processing apparatus capable of communicating with a communication device having at least one detection unit for detecting an environmental condition, comprising the steps of:

acquiring at least one item as a type of notification information of a notification object for which the communication device can provide notification relating to detection results from the at least one detection unit to the information processing apparatus in a case where a notification setting relating to the detection results from the at least one detection unit is set to be enabled, from the communication device, during a pairing operation with the communication device; and providing an instruction for enabling or disabling, during the pairing operation with the communication device, a notification setting relating to the detection results from the at least one detection unit for each item as the type of notification information of the notification object acquired in the acquiring to the communication device during the pairing operation with the communication device.

15. A non-transitory computer-readable storage medium configured to store a computer program comprising instructions for executing following processes by using an information processing apparatus capable of communicating with a communication device having at east one detection unit for detecting an environmental condition:

acquiring at least one item as a type of notification information of a notification object for which the communication device can provide notification relating to detection results from the at least one detection unit to the information processing apparatus in a case where a notification setting relating to the detection results from the at least one detection unit is set to be enabled, from the communication device, during a pairing operation with the communication device; and providing an instruction for enabling or disabling, during the pairing operation with the communication device, a notification setting relating to the detection results from the at least one detection unit for each item as the type of notification information of the notification object acquired in the acquiring to the communication device during the pairing operation with the communication device.

16. A communication control device capable of communicating with a communication device having at least one detection unit for detecting an environmental condition and an information processing apparatus, comprising:

at least one processor or circuit configured to function as:

an acquisition unit configured to acquire at least one item as a type of notification information of a notification object for which the communication device can provide notification relating to detection results from the at least one detection unit to the information processing apparatus in a case where a notification setting relating to the detection results from the at least one detection unit is set to be enabled, from the communication device, during a pairing operation between the information processing apparatus and the communication device; and a transmission unit configured to transmit an instruction for enabling or disabling, during the pairing operation between the information processing apparatus and the communication device, a notification setting relating to detection results from the at least one detection unit for each item as the type of notification information of the notification object that has been acquired by the acquisition unit and that the communication device reports to the information processing apparatus, during the pairing operation.

17. The communication control device according to claim 16, wherein the information processing apparatus and the communication device perform communication conforming to the Z-Wave standard.

18. The communication control device according to claim 16, wherein the information processing apparatus includes a camera, and the camera performs predetermined control in the case in which the camera receives a predetermined notification from the communication device, wherein the predetermined control includes at least one of an image pickup operation of the camera, direction control of the camera, or video image recording control of the camera.

19. The communication control device according to claim 16 further comprising a display unit configured to display a setting screen for setting the notification setting corresponding to the item to be enabled or disabled for each of the items acquired by the acquisition unit.

20. The communication control device according to claim 16, wherein, in the instruction, the notification settings for all the items acquired by the acquisition unit are enabled during the pairing.

21. A communication control method in a communication control device capable of communicating with a communication device having at least one detection unit for detecting an environmental condition and an information processing apparatus, comprising the steps of:

acquiring at least one item as a type of notification information of a notification object that the information processing apparatus has acquired from the communication device and for which the communication device can provide notification relating to detection results from the at least one detection unit to the information processing apparatus in a case where a notification setting relating to the detection results from the at least one detection unit is set to be enabled, from the information processing apparatus, during a pairing operation between the information processing apparatus and the communication device; and transmitting an instruction for enabling or disabling, during the pairing operation between the information processing apparatus and the communication device, a notification setting relating to the detection results from the at least one detection unit for each item as the type of notification information of the notification object that has been acquired in the acquiring and for which the communication device can provide notification to the information processing apparatus, to the information processing apparatus, during the pairing operation.

22. A non-transitory computer-readable storage medium configured to store a computer program comprising instructions for executing a communication control method in a communication control device capable of communicating with a communication device having at least one detection unit for detecting an environmental condition and an information processing apparatus, the method comprising the steps of:

acquiring at least one item as a type of notification information of a notification object that the information processing apparatus has acquired from the communication device and for which the communication device can provide notification relating to detection results from the at least one detection unit to the information processing apparatus in a case where a notification setting relating to the detection results from the at least one detection unit is set to be enabled, from the information processing apparatus, during a pairing operation between the information processing apparatus and the communication device; and transmitting an instruction for enabling or disabling, during the pairing operation between the information processing apparatus and the communication device, a notification setting relating to the detection results from the at least one detection unit for each item as the type of notification information of the notification object that has been acquired in the acquiring and for which the communication device can provide notification to the information processing apparatus, to the information processing apparatus, during the pairing operation.

* * * * *